United States Patent
Ben-Shalom et al.

(10) Patent No.: US 10,693,866 B2
(45) Date of Patent: Jun. 23, 2020

(54) SYSTEM, APPARATUS AND METHOD FOR FIRST HOP SECURITY

(71) Applicant: Intel Corporation, Santa Clara, CA (US)

(72) Inventors: Omer Ben-Shalom, Rishon Le-Tzion (IL); Ned M. Smith, Beaverton, OR (US); Alex Nayshtut, Gan Yavne (IL)

(73) Assignee: Intel Corporation, Santa Clara, CA (US)

( * ) Notice: Subject to any disclaimer, the term of this patent is extended or adjusted under 35 U.S.C. 154(b) by 936 days.

(21) Appl. No.: 15/088,308

(22) Filed: Apr. 1, 2016

(65) Prior Publication Data

US 2017/0289138 A1    Oct. 5, 2017

(51) Int. Cl.
*H04L 29/06* (2006.01)

(52) U.S. Cl.
CPC ........ *H04L 63/0823* (2013.01); *H04L 63/065* (2013.01)

(58) Field of Classification Search
CPC .......................... H04L 63/0823; H04L 63/065
See application file for complete search history.

(56) References Cited

U.S. PATENT DOCUMENTS

2005/0138369 A1* 6/2005 Lebovitz ............... H04L 12/185
713/163
2008/0307223 A1* 12/2008 Brickell ................ H04L 63/126
713/158
2016/0218866 A1* 7/2016 Patil ...................... H04L 9/0833

OTHER PUBLICATIONS

Ernie Brickell, et al., "Enhanced Privacy ID from Bilinear Pairing," Sep. 8, 2009, 23 pages.
U.S. Appl. No. 14/961,006, filed Dec. 7, 2015, entitled "System, Apparatus and Method for Providing Privacy Preserving Interaction With a Computing System," by Ned M. Smith, et al.
U.S. Appl. No. 14/976,165, filed Dec. 21, 2015, entitled "System, Apparatus and Method for Migrating a Device Having a Platform Group," by Ned M. Smith, et al.
Cisco, "IPv6 First-Hop Security Concerns," Cisco Press 2008, 5 pages.

* cited by examiner

*Primary Examiner* — Kendall Dolly
(74) *Attorney, Agent, or Firm* — Trop, Pruner & Hu, P.C.

(57) ABSTRACT

In one embodiment, a system includes a hardware processor having at least one core to execute instructions; and a logic to generate a group public key for a subnet having a plurality of computing devices and generate a plurality of group private credentials for the plurality of computing devices, provide the group public key to the plurality of computing devices and provide each of the group private credentials to one of the plurality of computing devices, to enable communication between the plurality of computing devices of the subnet without validation messaging with the system. Other embodiments are described and claimed.

21 Claims, 6 Drawing Sheets

SYSTEM, APPARATUS AND METHOD FOR FIRST HOP SECURITY

TECHNICAL FIELD

Embodiments relate to enhancing security in a network environment.

BACKGROUND

Recently, the Internet Protocol (IP) has been extended from prior IPv4 addressing mechanisms to IPv6 addressing mechanisms to address the explosion in connected devices. While the new protocol promises greater expandability, there are security concerns that have not been fully addressed. For example, in IPv6 there are concerns that it is possible to attack the basic network protocols used in a 'first hop' or local subnet. Such protocols include router advertisements and neighbor discovery among others. Current solutions to this concern depend on public key infrastructure (PKI) keys to authenticate packets sent by routers and hosts on the subnet. However, this solution is not very scalable since each host needs to have a separate PKI key pair, and validation requires a validating entity to have access to the public keys of all hosts, which in turn requires access to a central repository/registrar. As such, there can be a high latency involved in any aspect of protocols having validation requirements.

DETAILED DESCRIPTION

In various embodiments, direct anonymous attestation (DAA) or other privacy preserving group or community keys can be generated and provided to computing devices within a subnet or other network portion to enable the computing devices to perform local validations, avoiding the communication and complexity of interacting with a third party for such validations. Although the scope of the present invention is not limited in this regard, in an embodiment community keys based on Intel® Enhanced Privacy Identifiers (EPIDs) may be used to provide multiple private keys for use with a common public key.

On joining a network, a host will ascertain its posture (using methods such as Institute of Electrical and Electronics Engineers (IEEE) 802.1x/network accesses control (NAC)/network access protection (NAP)) and obtain a private key that can be validated with a corresponding community key. This common public key can be provided to other hosts within the network, e.g., via a router as part of an IPv6 router advertisement which every host uses to ascertain a default gateway, construct an IPv6 address using stateless address autoconfiguration (SLACC) and so on. At this point, there is no need for access to a central authority/registrar for purposes of IPv6 validations, which instead can occur locally. As such, active communication between hosts can occur without validating accesses with such central authority, making an IPv6 environment better performing and more stable. Stated another way, hosts can communicate, e.g., peer-to-peer or in a multicast manner, without re-intermediation with the central authority/registrar to validate the communications.

As such, embodiments reduce latency of a round trip query/response from a central repository. In addition, scalability is enhanced since the same community key can support any number of hosts that are part of the same trust group. Here, this trust group may be an IPv6 subnet; however, the scope of the present invention is not limited in this regard, and may be generalized to a supernet (e.g., campus, company or so forth). Embodiments may further support scalability of multicast traffic which is destined to multiple hosts. In addition, network stability is enhanced by reducing the dependency on a registrar for real-time packet level validation, all while maintaining the same level of security as personal keys.

Figure 1:
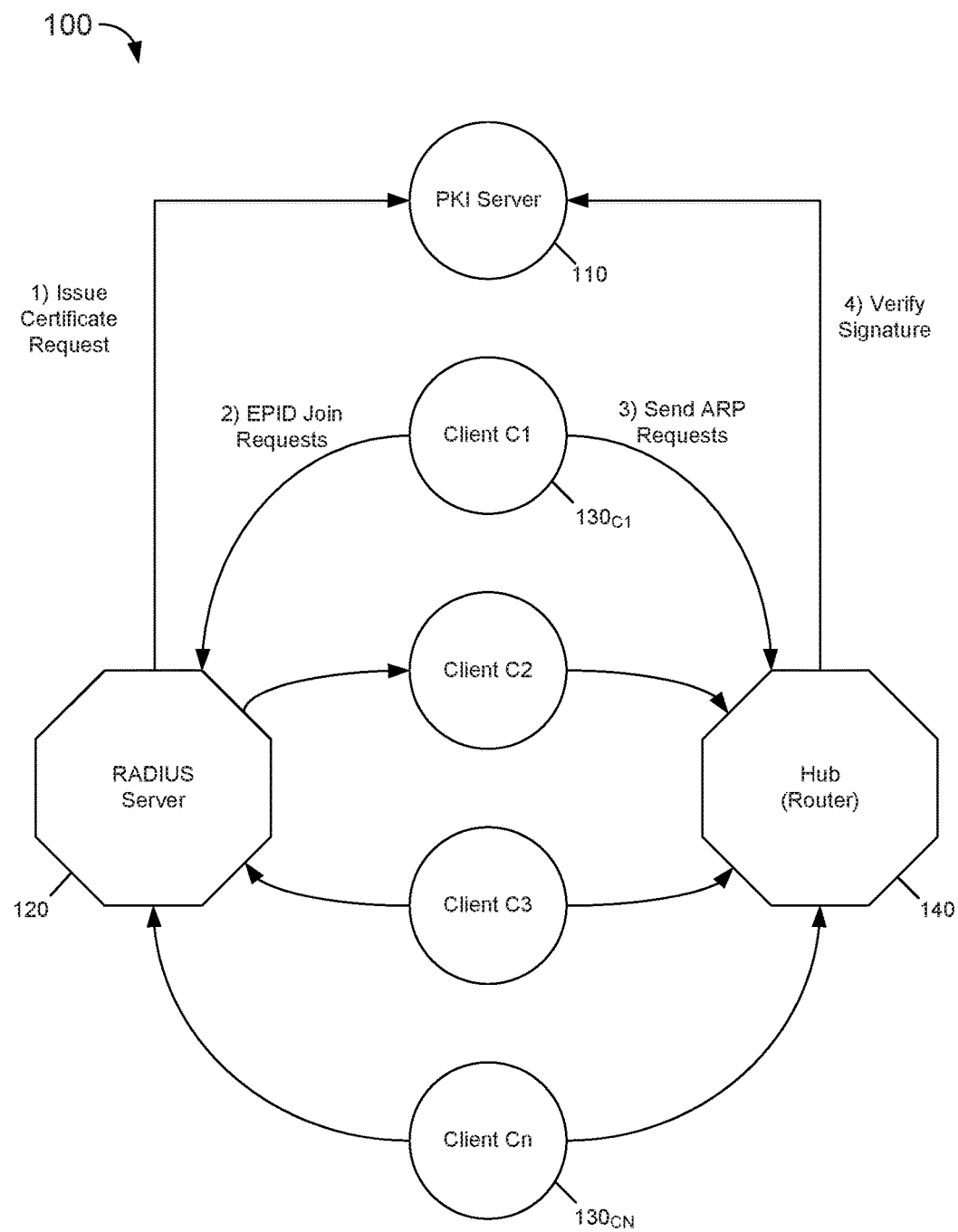
FIG. 1 is a block diagram of a system model in accordance with an embodiment of the present invention.

Referring now to FIG. 1, shown is a block diagram of a system model in accordance with an embodiment of the present invention. As illustrated in FIG. 1, a network 100 may be all or a portion of a given network environment, such as a local area network, wide area network or so forth. Many different types of network environments are contemplated by the embodiments described herein. In the illustration of FIG. 1, for ease of explanation, assume that a network 100 is a particular subnet in which a plurality of client computing devices $130_{C1}$-$130_{CN}$ are present. For ease of discussion herein, such computing devices, which may take many different forms, ranging from small portable devices such as smartphones, tablet computers, laptop computers and even Internet of Things (IoT) devices, to larger systems such as desktop computers, server computers, may be interconnected together in a variety of wired or wireless manners. In various embodiments, hosts 130 may act as supplicants in this subnet context to receive and store private keys, sign relevant messages (e.g., neighbor advertisements) and validate like messages from other hosts.

In addition, hosts 130 also communicate with an authentication server 120, referred to herein in as a remote authentication dial-in user service (RADIUS) server. RADIUS server 120 may be configured to authenticate hosts and provide private keys as part of an IEEE 802.1x exchange process. In turn, RADIUS server 120 may communicate with a public key infrastructure (PKI) server 110. In fact in some embodiments, RADIUS server 120 may act as a proxy for performing at least portions of a group membership join protocol in accordance with an embodiment of the present invention.

As will be described herein, server 110 may be configured to generate community public and private keys. In addition, a hub or router 140 may further be present within the network environment. Router 140 may be configured to serve as an authenticator role, keep and broadcast community keys on the subnet in router advertisements.

FIG. 1 further shows high level operations performed by the different devices to enable inclusion of hosts 130 within a given subnet and generation of community keys and provision of the same to the computing devices or hosts. After being provisioned with appropriate group public and private keys, individual hosts may communicate and validate communications with other hosts and entities within the network environment without requiring remote authentications (e.g., via one or more of RADIUS server 120, PKI server 110, and/or router 140).

To this end, FIG. 1, at a high level, shows a block diagram of flow of creation of a community key generation process in accordance with an embodiment. As seen, in a first step, a certificate for a subnet may be requested, e.g., via authentication server 120, when the subnet is formed. Responsive to this request, PKI server 110 provides a suitable community public key. Next, network hosts (clients 130$_{C1}$-130$_{CN}$) request membership in the subnet by issuing a request to join the subnet. Thereafter, each such client 130 may enter into a membership join protocol with PKI server 110 to be provisioned with a given group public key and a corresponding group private key. Note that this group public key may be a single group key that is provided to all members of a given group, e.g., subnet, while instead a given group private key is a single private key issued to a particular host. In this way, privacy of the individual hosts may be maintained, while at the same time allowing the individual hosts to attest to the fact that they are valid members of a given group, e.g., subnet. In one embodiment, this host-initiated request may be implemented in the context of an EPID join protocol. Authentication server 120 replies (e.g., acting as a proxy with regard to PKI server 110) with an appropriate response (such as a membership credential) which is combined with an entropic value generated by each client. The resulting private key generated is unique per client.

Thus at the conclusion of a membership join protocol, a given client is provisioned with key material to enable it to enter into communications within the subnet, including potentially communications directly with the other hosts within the subnet in a manner that preserves privacy. At this point, communications may occur within the subnet. As an example, a given client 130 may issue a signed address resolution protocol (ARP) request to obtain a link address, which is signed using the group private key of the requesting client. Thereafter, a validator (which may be one of the other clients in the subnet or, e.g., router 140) verifies the signature using the certificate that was created earlier.

In an embodiment, hub 140 uses group and private key certificate revocation lists (CRLs) periodically obtained from PKI server 110 as part of verification processes. A signature revocation list (Sig-RL) may be supplied to clients 130 on a periodic basis. As an example, these updates may be configured by pushing Sig-RL changes in router discovery messages to all clients, which in turn may update internal CRLs.

Understand that in some embodiments, clients 130 (or at least some of them) may be configured to initiate updates to a revocation list such as a signature revocation list and/or a private key revocation list. For example, assume that a first client detects compromise of another client in the subnet. In this instance, the first client may generate and sign (with its group private key) a multicast message (using the IP address of the subnet as the multicast address), and then send this message. In different examples this message may be an update to identify the compromised device, or it may be a communication of the client's revocation list, including this update to identify the compromised other client. By circulating this list to the members of the subnet, the members can be timely informed of the compromise in a low impact manner.

Note that each of the computing devices shown in FIG. 1 may include a trusted execution environment (TEE), in which the security operations described herein may be performed. To this end, in at least some embodiments, a given processor or system on chip (SoC) (or portion thereof) included in the different computing devices may include separate secure circuitry (or may be configured) to operate in a secure mode. Such secure mode provides the TEE that is isolated from non-secure hardware/software/firmware. In example embodiments, a TEE of the device may leverage Intel® Software Guard Extensions (SGX), Intel® Mem-Core, Intel® Converged Security Engine (CSE), Intel® virtualization technology (VT-X), Intel® IOT-OS with Smack, ARM TrustZone, or any other secure environment. In some cases, the TEE may be implemented in a secure co-processor or hardware security module. Understand while shown at this high level in the embodiment of FIG. 1, many variations and alternatives of different network environments may exist that can leverage embodiments described herein.

Figure 2:
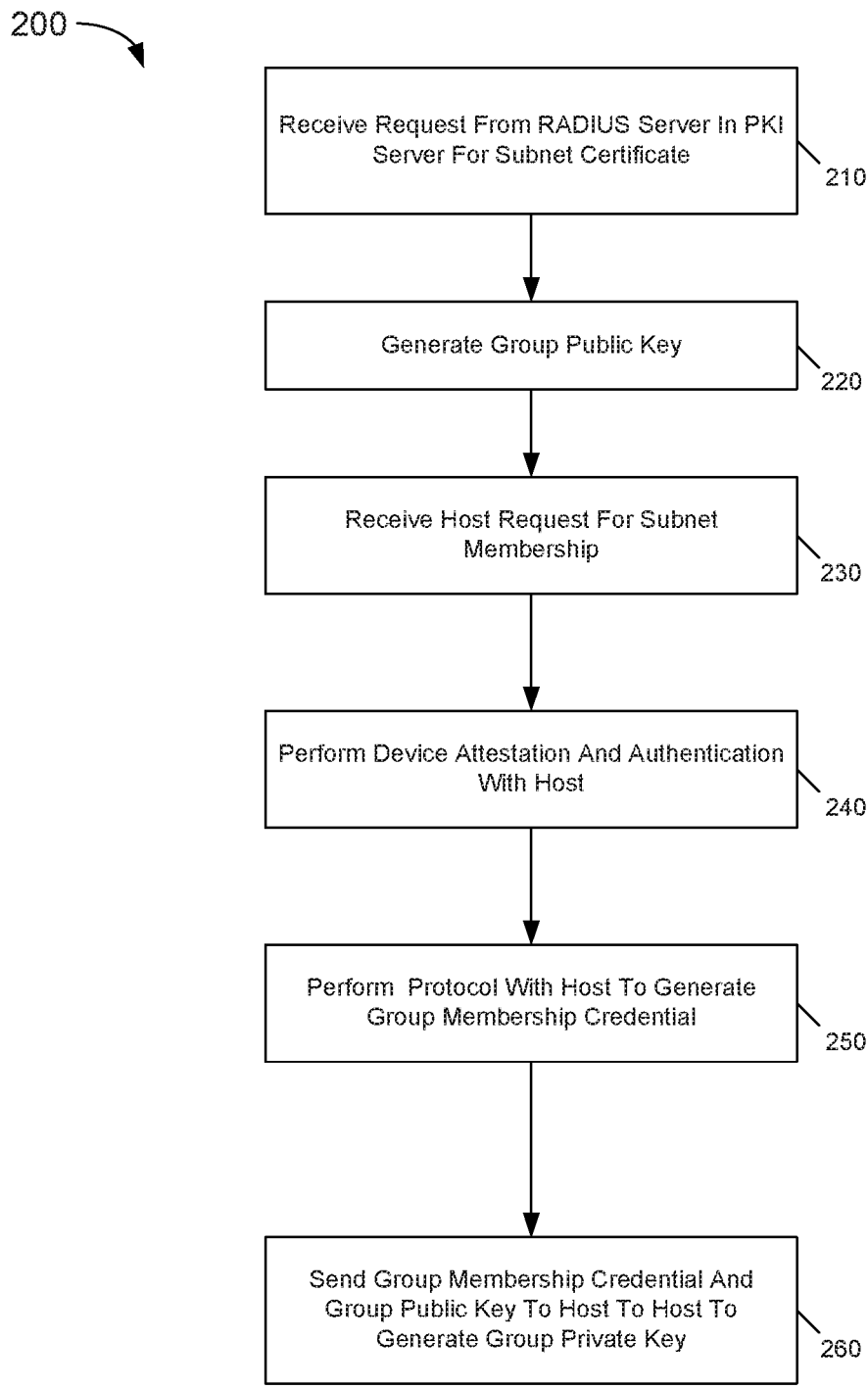
FIG. 2 is a flow diagram of a method in accordance with an embodiment of the present invention.

Referring now FIG. 2, shown is a flow diagram of a method in accordance with an embodiment of the present invention. More specifically, method 200 shown in FIG. 2 may be performed by interaction with various computing devices in a subnet to provision community keys to individual clients to enable their further interaction in a privacy preserving manner. As illustrated, method 200 begins by receiving a request from a RADIUS server in a PKI server for a subnet certificate (block 210). Such request may be received by the RADIUS server when the subnet is created. Responsive to this request, the PKI server may generate a group public key (block 220). In an embodiment, this group public key may be based, at least in part, on a group identifier associated with the subnet. In some embodiments, this group identifier may correspond to at least a portion of an IPv6 address for the subnet.

With further reference to FIG. 2, at block 230 a host request is received. More specifically, this host request is for membership in the given subnet. This request may be received from the host in the RADIUS server, which may forward the request along to the PKI server. At block 240 a device attestation and authentication may be performed with the host (block 240). In an embodiment this attestation and authentication may be based on one or more manufacturer-supplied certificates present in the computing device, such as a manufacturer-supplied attestation key. Such key may be a conventional manufacturer certificate/private key. In other cases, this key may be a manufacturer EPID/DAA key embedded in a host TEE. This attestation reveals the kind of device and who manufactured it. In the case of an EPID/DAA key, the specific device instance is not revealed. If this is the case, a separate process may be performed for provisioning a device identity and device specific credential; however, this provisioning may be performed outside of the scope of the present embodiments.

Assuming that the device has successfully been authenticated, control passes to block 250 where a protocol may be performed with the host to generate a group membership credential. In an embodiment, an Intel® EPID Join protocol may be performed to generate this group membership credential, which in turn is provided to the host (at block 260). Note that this group membership credential may be sent along with the group public key. As such after the host generates a group private key from the membership credential, the host can sign requests using the group private key, and validate incoming requests using the group public key.

As one example, an issuer (e.g., PKI server 110) may select at least a portion of an IP address of the subnet as an EPID group ID. More specifically, this IP address may be randomly selected (e.g., using a pseudo random number generator). If it is determined that this address conflicts with another address in the network, then another IP address may be randomly selected again. In an embodiment, this group ID thus may be expressed in terms of an IP address and a subnet mask (e.g., in IPv4: 10.9.8.0 address; mask: 255.255.255.000). By convention, use of a zero value in the address fields implies where the mask may be applied. According to IPv6, the EPID group ID may be a 128 bit (16-byte) number. Using a dot to separate each byte in an IPv6 address (16 bytes) the group ID may be as follows, in an example: G1=000.000.000.000.000.000.000.000. 000.000.000.010.009.008.000. In turn, the mask may be as follows: 255.255.255.255.255.255.255.255.255.255.255. 255.255.255.255.000. The mask value of 255 retains the value specified in the address bytes, while a value of 000 allows devices with IP addresses that differ in only the last byte of the address. Thus in this example, there could be 255 members of the group G1. In such example, the RADIUS server may refuse to perform the Join protocol for more than 255 members since doing so would imply that two members share the same address. Of course, site-specific policies may be applied as to appropriate group ID selection.

In turn, the host may implement the Join protocol by receipt of join protocol parameters (e.g., including a membership credential). From this membership credential and a random value (generated in the host), the host may generate an EPID private key associated with G1 (e.g., by way of a mixing or other concatenation function). This private key is unique to the host. Understand while described at this high level in the embodiment of FIG. 2, many variations and alternatives are possible.

Figure 3:
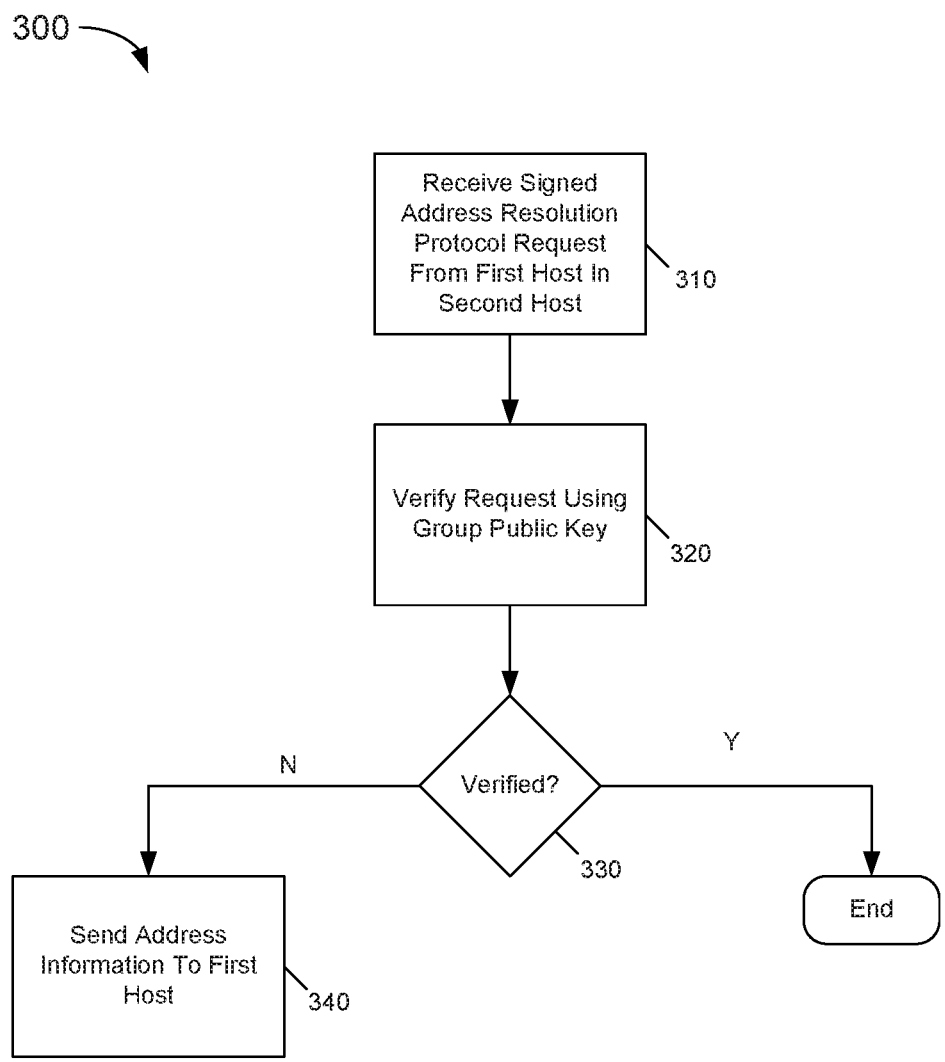
FIG. 3 is a flow diagram of an authentication method in accordance with an embodiment of the present invention.

Referring now to FIG. 3, shown is a flow diagram of an authentication method in accordance with an embodiment of the present invention. In an embodiment, this authentication process may be performed by a given entity within a subnet. More specifically, method 300 assumes that an initiator of a request for ARP is one host, and a second host is to verify this request. As illustrated, at block 310 a signed ARP request is received in a second host from a first host (host1). As one example, this second host (host2) may be an IP router that is performing a domain name system (DNS) translation to establish a direct connection to another host, referred to herein as host3. Understand that this ARP request may be signed by the group private key of the first host. At block 320, the second host may verify the request. More specifically, the second host may use the group public key to determine whether the ARP request was validly signed by a member of the group. If so, verification passes (at diamond 330), and accordingly at block 340 address information is sent to the first host. Otherwise, the verification fails, and no address information is sent. Understand that of course other operations may be performed in certain embodiments.

In the above example where the second host is an IP router, the DNS name "host3.my.network.org" may map to a group identifier (e.g., G1 as above) where byte 16 contains the host3 IP address bits that are unique to host3. Before host2 translates the DNS name to an IP address, it verifies the signature over the DNS request that was applied by host1 using the EPID private key for EPID group G1.

Continuing with this example, host2 may then verify the DNS request using the group public key (G1 public key). If the DNS name (e.g., "host3.my.network.org") translates to another address that is a member of this group then the IP address of host3 is returned to host1. As such, host2 is acting as an enforcement point that prevents DNS services being used by non-group members.

Note the above verification process may not ensure that host1 cannot attempt to connect directly to host3 if it knows or guesses one of the possible addresses (there are only 255 to try in this example). In such flow, host1 signs a message. For example it could be a datagram transport layer security (DTLS) handshake message. Host3 verifies the host1 signature using the public key (and vice versa if a bi-lateral authentication is to occur). The result is a secure DTLS session between host1 and host3, where each knows the opposite is a member of G1. Each host also knows the other's IP address, but assuming IP addresses are dynamically assigned (e.g., via a dynamic host configuration protocol (DHCP)), knowledge of the IP address does not allow host1 or host3 to maintain a dossier on the other indexed by IP address.

Note also that the IP address assigned could be a multicast address that allows all members of the group to receive messages broadcast to the group. Here, the members that are monitoring a multicast group could also be a member of an EPID group having the same name, that of the multicast address. If the messages are signed using a given group private key, all members of the group could verify the messages were received from another group member by verifying using the corresponding group public key. This operation may be more secure than use of symmetric keys, where a shared symmetric key would allow non-group members to masquerade as group members or where every group member would receive a message encrypted using N symmetric keys (for N members of the group). More generally, overloading a group identifier with an IP address means the DNS and DHCP (or manual static configuration) processes can be used to implement much of the group lifecycle management work.

Similarly, if a universally unique identifier (UUID) is normally used to identify an administrative domain such as an object identifier in a Microsoft® Windows or Active Directory registry, all the entities that belong to that registry entry could also be members of an EPID group. For example, Active Directory might list a number of computing devices that belong in a given geographic location. In this case, the same identity could be used by EPID where EPID private keys could be issued to the devices listed in Active Directory. Consequently, any interaction between members of the group and entities outside the group can be achieved with EPID values, without any change to group identity semantics.

Note that existing code that has captured group semantics need not be re-written to map existing group semantics to match EPID-based groups. Because of an implied mapping from a 128-bit value to a 32-bit value, there may be an increased possibility of group name overlap, and if a name collision occurs, some type of handler code may be executed to resolve the collision.

Also, by defining EPID groups using 128-bit values, an owner of a network/enterprise/industrial site, etc. may appropriately manage namespaces so that, for example, UUIDs are selected that do not collide with multicast addresses. Since these are different uses and use cases, it would be a security violation for an attacker to spoof the system into using a UUID to send multicast packets or vice versa.

As described above, in one embodiment, an EPID Join protocol may be used by a member to interact with the issuer to obtain a unique Intel® EPID private key such that the member's private key is unknown to the issuer. Note that the issuer may authenticate the member through other mechanisms. The join protocol has the following steps, in one embodiment:

1. The Radius Server (Issuer) chooses an EPID group for the subnet. Let gid be the chosen group ID. Let (gid, h1, h2, w) (where h1 and h2 are elements in G1 and w is an element of G2, used to generate a group public key) be the group public key and (gid, gamma) (where gamma is an integer between [1, p−1] be the group issuing private key. The gid may be chosen to be a 128-bit value corresponding to a subnet. If the subnet mask is shorter it will be padded with zeros.
2. Let NI be a 256-bit nonce chosen by the issuer.
3. The member chooses a random integer f between [1, p−1] or derives f between [1, p−1] from some seed value. This step is out of the scope of this specification.
4. The member runs a JoinP-process to create a join request (F, c, s) (where c and s are integers between [1, p−1]. The JoinP process is specified below.
5. The member sends the join request (F, c, s) to the issuer.
6. The issuer runs the JoinI process to create a membership credential (gid, A, x) (where A is an element of G1 and x is an integer between [1, p−1] for the member. The JoinI process is specified below.
7. The issuer sends the membership credential (gid, A, x) to the member.
8. The member concatenates the membership credential (gid, A, x) received and the f value generated in step 3 into an EPID private key (gid, A, x, f). The member can validate the private key, e.g., as specified by a PKI server.

The details of a JoinP algorithm in accordance with an embodiment of the present invention is specified in Table 1:

TABLE 1

Input
(gid, h1, h2, w): an EPID group public key
f: an integer between [1, p-1]
NI: a 256-bit string
Output
(F, c, s): a join request
Steps
The following variables F, R (elements of G1), and r, c, s (256-bit integers) are used.
1. The member chooses a random integer r from [1, p-1].
2. The member computes F = G1.sscmExp(h1, f).
3. The member computes R = G1.sscmExp(h1, r).
4. The member computes c = Fp.hash(p ∥ g1 ∥ g2 ∥ h1 ∥ h2 ∥ w ∥ F ∥ R ∥ NI).
5. The member computes s = (r + c · f) mod p.
6. The output join request is (F, c, s).

The details of a JoinI algorithm in accordance with an embodiment of the present invention is specified in Table 2:

TABLE 2

Input
(gid, h1, h2, w): an EPID group public key
(gid, gamma): the issuing private key corresponding to the public key
NI: a 256-bit string
(F, c, s): a join request
Output
(gid, A, x): a membership credential
Steps
The following variables R, t3, A (elements of G1), and nc, x, t1, t2 (256-bit integers) are used.
1. The issuer verifies G1.inGroup(F) is true.
2. The issuer verifies s in [0, p-1].
3. The issuer computes nc = (-c) mod p.
4. The issuer computes R = G1.multiExp(h1, s, F, nc).
5. The issuer verifies c = Fp.hash(p ∥ g1 ∥ g2 ∥ h1 ∥ h2 ∥ w ∥ F ∥ R ∥ NI).
6. If any of the above verifications fail, the join request is invalid, and the issuer aborts and outputs failure.
7. The issuer chooses x randomly from [1, p-1].
8. The issuer computes integer t1 = (gamma + x) mod p.
9. The issuer computes integer t2 = inverse(t1) mod p, the inverse of t1 modulo p.
10. The issuer computes t3 = G1.mul(g1, F).
11. The issuer computes A = G1.exp(t3, t2).
12. The output membership credential is (gid, A, x).

Figure 4:
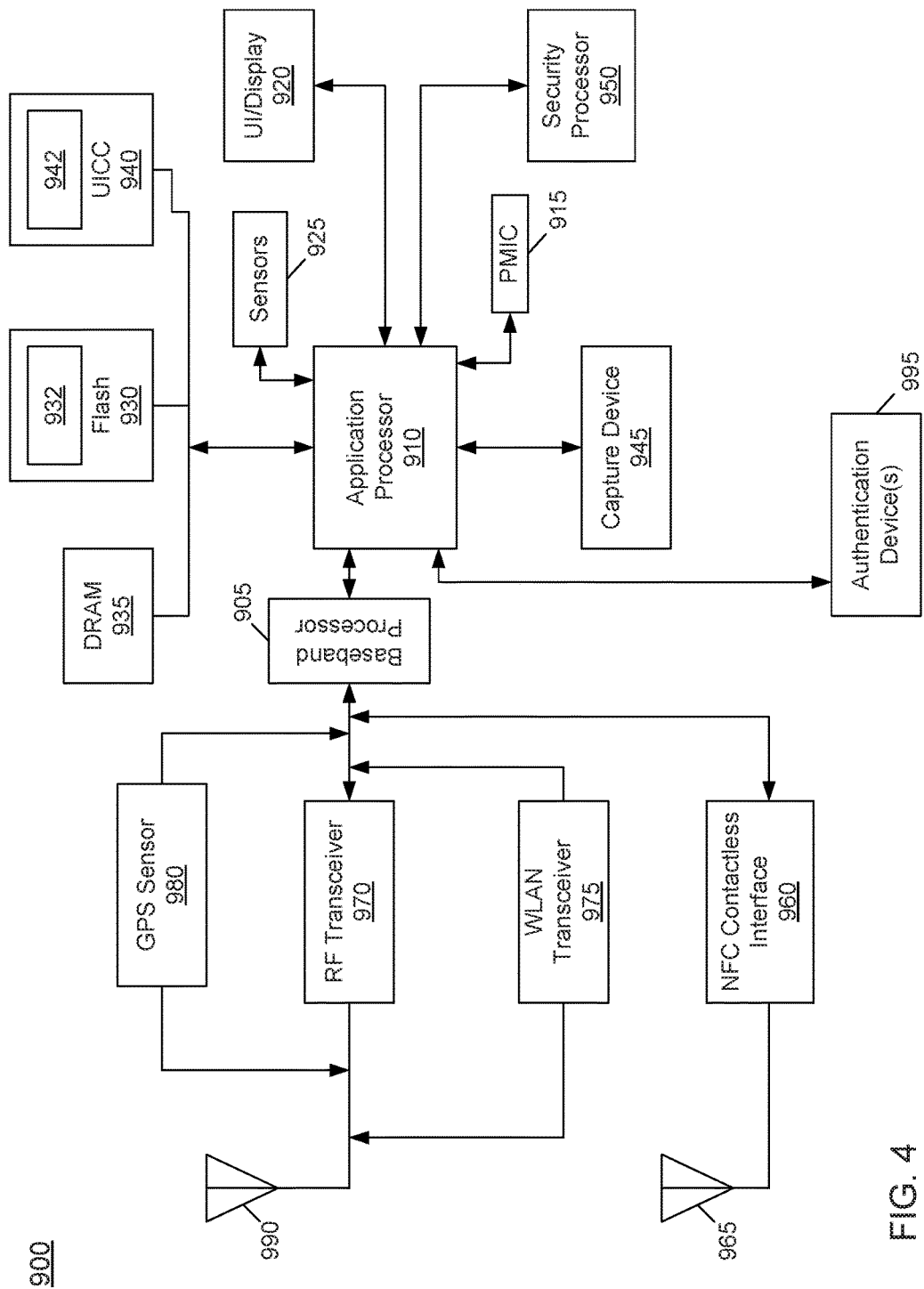
FIG. 4 is a block diagram of an example system with which embodiments can be used.

Referring now to FIG. 4, shown is a block diagram of an example system with which embodiments can be used. System 900 may be a given client to be at least temporarily included as a member in a network subnet. In an example, system 900 may be a smartphone or other wireless communicator or any other IoT device. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. In some embodiments, flash memory 930 may include a secure portion 932 in which secrets and other sensitive information may be stored. As further seen, application processor 910 also couples to a capture device 945 such as one or more image capture devices that can record video and/or still images.

Still referring to FIG. 4, a universal integrated circuit card (UICC) 940 comprises a subscriber identity module, which in some embodiments includes a secure storage 942 to store secure user information. System 900 may further include a security processor 950 that may that may implement a TEE, and which may couple to application processor 910. Furthermore, application processor 910 may implement a secure mode of operation, such as Intel® SGX extensions to a given instruction set architecture, and circuitry for hosting of a TEE. Security processor 950 and/or application processor 910 may be configured to be a group member and receive a group public key and generate a group private key based on interaction with a server, as described herein, to enable system 900 to interact with other devices in a subnet. A plurality of sensors 925, including one or more multi-axis accelerometers may couple to application processor 910 to enable input of a variety of sensed information such as motion and other environmental information. In addition, one or more authentication devices 995 may be used to receive, e.g., user biometric input for use in authentication operations.

As further illustrated, a near field communication (NFC) contactless interface 960 is provided that communicates in a NFC near field via an NFC antenna 965. While separate antennae are shown in FIG. 4, understand that in some implementations one antenna or a different set of antennae may be provided to enable various wireless functionality.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more IoT networks, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present, with location information being provided to security processor 950 for use as described herein when context information is to be used in a pairing process. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Figure 5:
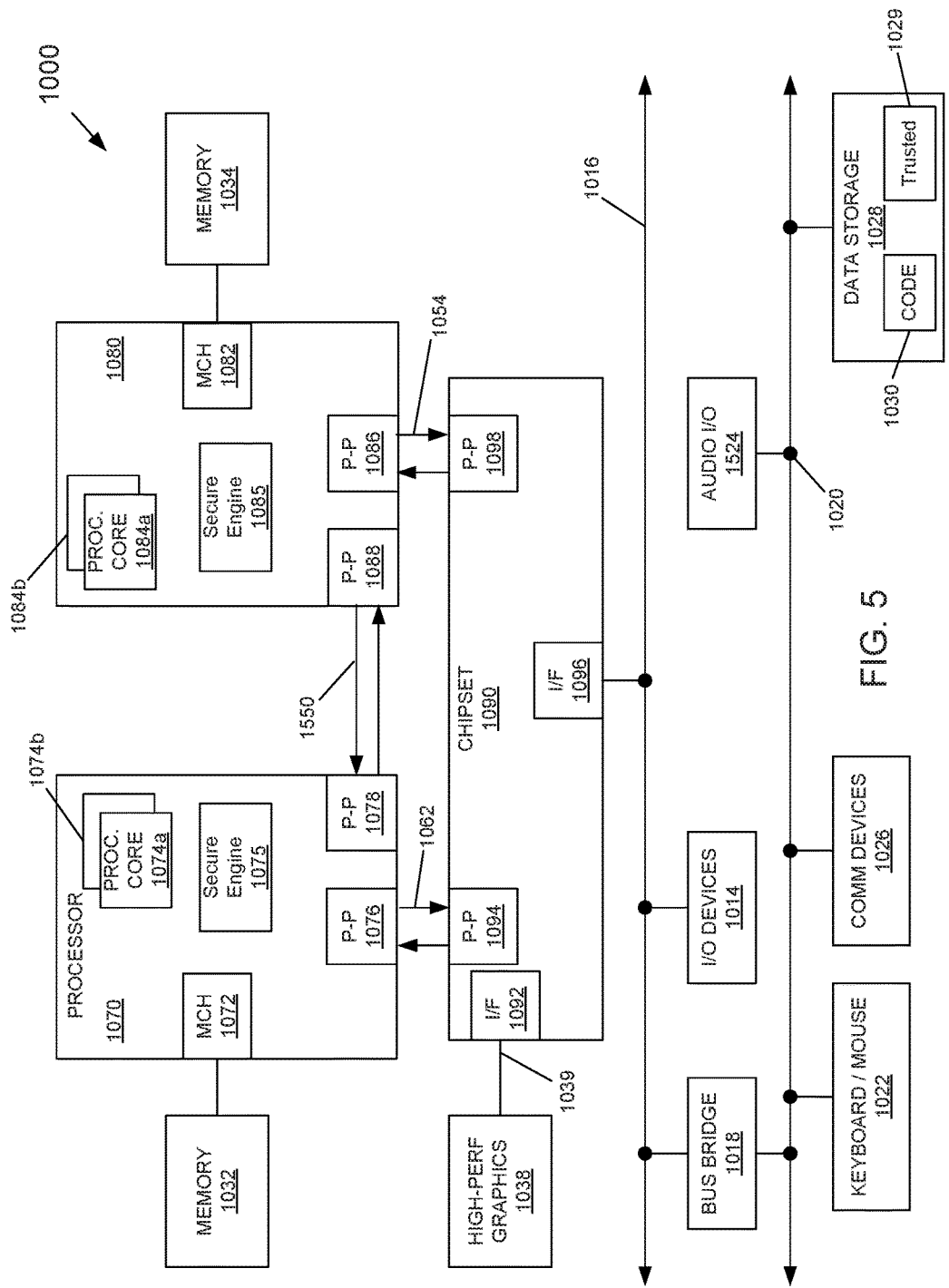
FIG. 5 is a block diagram of a system in accordance with another embodiment of the present invention.

Referring now to FIG. 5, shown is a block diagram of a system in accordance with another embodiment of the present invention. As shown in FIG. 5, multiprocessor system 1000 is a point-to-point interconnect system such as a server system, and includes a first processor 1070 and a second processor 1080 coupled via a point-to-point interconnect 1050. In an embodiment, system 1000 may be a PKI server. As shown in FIG. 5, each of processors 1070 and 1080 may be multicore processors such as SoCs, including first and second processor cores (i.e., processor cores 1074*a* and 1074*b* and processor cores 1084*a* and 1084*b*), although potentially many more cores may be present in the processors. In addition, processors 1070 and 1080 each may include a secure engine 1075 and 1085 to perform group key generation (e.g., using a group ID based at least in part on a subnet IP address) and group private membership credential generation operations as described herein, among other operations.

Still referring to FIG. 5, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 5, MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1052 and 1054, respectively. As shown in FIG. 5, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 5, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

Figure 6:
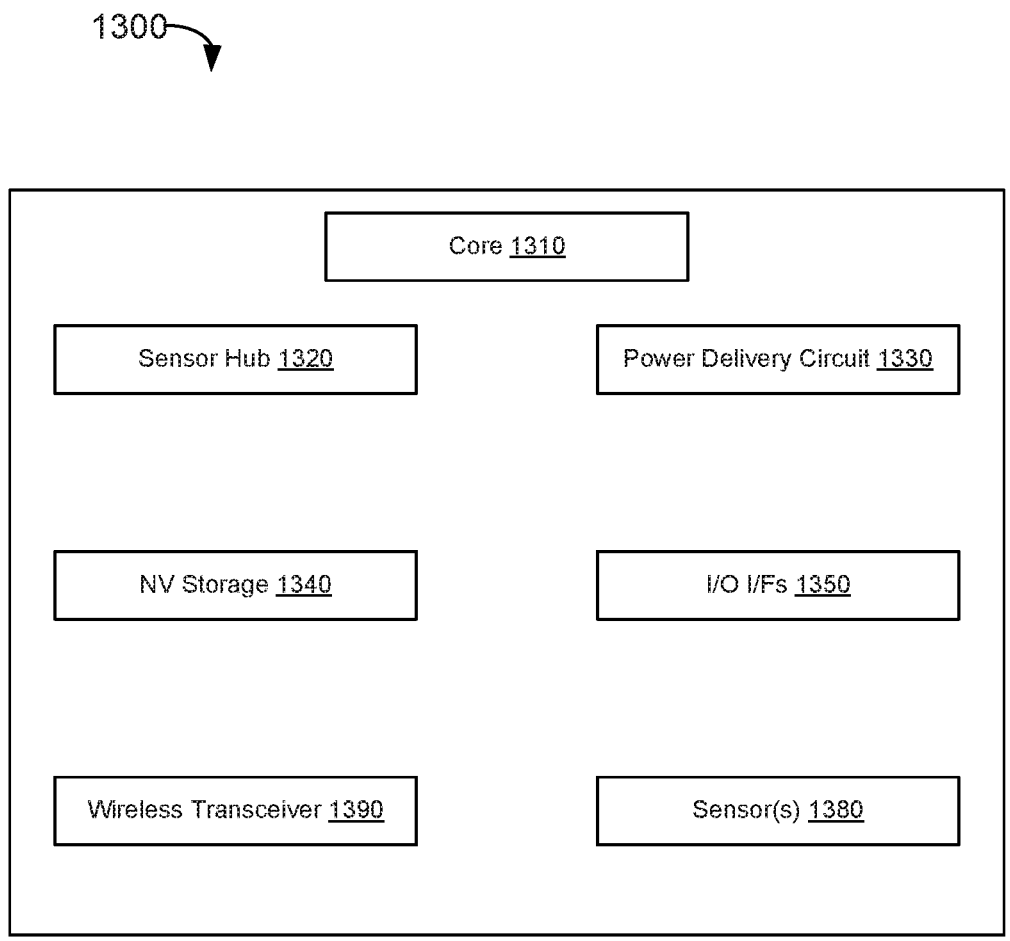
FIG. 6 is a block diagram of a system in accordance with another embodiment of the present invention.

Embodiments may be used in environments where IoT devices may include wearable devices or other small form factor IoT devices. Referring now to FIG. 6, shown is a block diagram of a wearable module 1300 in accordance with another embodiment. In one particular implementation, module 1300 may be an Intel® Curie™ module that includes multiple components adapted within a single small module that can be implemented as all or part of a wearable device. Module 1300 may be configured to be a client device for inclusion in a subnet, as described herein. As seen, module 1300 includes a core 1310 (of course in other embodiments more than one core may be present). Such core may be a relatively low complexity in-order core, such as based on an Intel Architecture® Quark™ design. In some embodiments, core 1310 may implement a TEE as described herein. Core 1310 couples to various components including a sensor hub 1320, which may be configured to interact with a plurality of sensors 1380, such as one or more biometric, motion environmental or other sensors. A power delivery circuit 1330 is present, along with a non-volatile storage 1340. In an embodiment, this circuit may include a rechargeable battery and a recharging circuit, which may in one embodiment receive charging power wirelessly. One or more input/output (IO) interfaces 1350, such as one or more interfaces compatible with one or more of USB/SPI/I²C/GPIO protocols, may be present. In addition, a wireless transceiver 1390, which may be a Bluetooth™ low energy or other short-range wireless transceiver is present to enable wireless communications as described herein. Understand that in different implementations a wearable module can take many other forms. Wearable and/or IoT devices have, in comparison with a typical general purpose CPU or a GPU, a small form factor, low power requirements, limited instruction sets, relatively slow computation throughput, or any of the above.

The following Examples pertain to further embodiments.

In Example 1, a system comprises: a hardware processor having at least one core to execute instructions; and a logic to generate a group public key for a subnet having a plurality of computing devices and generate a plurality of group private credentials for the plurality of computing devices, provide the group public key to the plurality of computing devices and provide each of the group private credentials to one of the plurality of computing devices, to enable communication between the plurality of computing devices of the subnet without re-intermediation by the system to validate the communication.

In Example 2, the logic is to generate the group public key responsive to a request from an authentication server after the subnet is created.

In Example 3, the logic is to generate a first group private credential responsive to a request from a first computing device to join the subnet.

In Example 4, the logic is to send the first group private credential to the first computing device, where the first computing device is to generate a first group private key based on the first group private credential and a random value In Example 5, the logic is to select a group identifier for the subnet and generate the group public key based at least in part on the group identifier.

In Example 6, the logic is to select the group identifier to correspond to at least a portion of an IP address of the subnet.

In Example 7, the logic is to generate a group issuing private key, and use the group issuing private key to generate the plurality of group private credentials.

In Example 8, the system comprises a public key infrastructure server to provide the plurality of group private credentials and the group public key to the plurality of computing devices, to enable the plurality of computing devices to validate messages therebetween without further interaction with the public key infrastructure server.

In Example 9, the system further comprises a second logic to maintain a revocation list for the subnet and communicate updates to the revocation list to the subnet.

In Example 10, a method comprises: sending a request to a first server to join a subnet including a plurality of devices, the request including a value generated based on a random value; communicating with the first server to receive a group public key and a membership credential; generating a group private key based on the membership credential and the random value; and storing the group public key and the group private key in a storage.

In Example 11, the method further comprises signing an address resolution protocol request with the group private key and sending the signed address resolution protocol request to one or more of a plurality of devices in the subnet, where at least one of the one or more of the plurality of devices in the subnet is to verify the signed address resolution protocol request using the group public key.

In Example 12, the method further comprises communicating with a second server to send the request to the first server, the first server comprising a public key infrastructure server.

In Example 13, the method further comprises maintaining a revocation list and updating the revocation list responsive to an update message received from the first server.

In Example 14, the method further comprises receiving a second signed address resolution protocol request from a second device in the subnet and verifying the second signed address resolution protocol request using the group public key.

In Example 15, the method further comprises receiving a multicast message having a multicast address corresponding to an IP address of the subnet and verifying the multicast message using the group public key, where the multicast message is signed by a first group private key of another device of the plurality of devices.

In Example 16, the method of one or more of the above Examples further comprises, in response to detection by the system of a compromise to a device of the subnet, generating and sending a multicast message to the subnet, the multicast message signed by the group private key, where the multicast message to indicate the compromise.

In another example, a computer readable medium including instructions is to perform the method of any of the above Examples.

In another example, a computer readable medium including data is to be used by at least one machine to fabricate at least one integrated circuit to perform the method of any one of the above Examples.

In another example, an apparatus comprises means for performing the method of any one of the above Examples.

In Example 17, a system comprises: a plurality of computing devices, where the plurality of computing devices form at least a portion of a subnet; and an authentication server coupled to the plurality of computing devices, where the authentication server is to generate a group public key for the subnet and generate a plurality of group private credentials for the plurality of computing devices, provide the group public key to the plurality of computing devices and provide each of the group private credentials to one of the plurality of computing devices.

In Example 18, the system further comprises a second server coupled to the plurality of computing devices and the authentication server, where the second server comprises a RADIUS server.

In Example 19, the authentication server is to select a group identifier to correspond to at least a portion of an IP address of the subnet and generate the group public key based at least in part on the group identifier.

In Example 20, the authentication server is to generate a group issuing private key, and use the group issuing private key to generate the plurality of group private credentials.

In Example 21, a first computing device in the subnet comprises: a first logic to receive a signed address resolution protocol from a second computing device in the subnet and verify the signed address resolution protocol request using the group public key; and a second logic to receive a multicast message having a multicast address corresponding to at least a portion of an IP address of the subnet and verify the multicast message using the group public key, where the multicast message is signed by a first group private key of another computing device in the subnet.

In Example 22, a system comprises: means for generating a group public key for a subnet having a plurality of computing devices; means for generating a plurality of group private credentials for the plurality of computing devices; means for providing the group public key to the plurality of computing devices; and means for providing each of the group private credentials to one of the plurality of computing devices, to enable communication between the plurality of computing devices of the subnet.

In Example 23, the means for generating the plurality of group private credentials is to generate a first group private credential responsive to a request from a first computing device to join the subnet.

In Example 24, the system further comprises means for selecting a group identifier for the subnet, and where the means for generating the group public key is to generate the group public key based at least in part on the group identifier.

Understand that various combinations of the above Examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory computer readable storage medium comprising instructions that when executed enable a first host system to:
   use a manufacturer-supplied key of the first host system to authenticate the first host system to an authentication server of a subnet;
   send a subnet join request to the authentication server of the subnet;
   receive a group public key for the subnet;
   after authenticating the first host system to the authentication server and sending the subnet join request to the authentication server, receive a group membership credential for the subnet from the authentication server;
   generate a random value "f1" and generate a first group private key for the first host system, based at least in part on (a) the group membership credential for the subnet from the authentication server and (b) the random value "f1", wherein the first group private key corresponds to the group public key, in that data encrypted with the first group private key can be decrypted with the group public key; and
   in response to receiving an address resolution protocol (ARP) request from a second host system on the subnet, wherein the ARP request comprises a signature that was generated by the second host system using a second group private key that was generated by the second host system based at least in part on a random value "f2" that was generated by the second host system, use the group public key and the signature in the ARP request to validate that the ARP request was generated by an authenticated member of the subnet.

2. At least one non-transitory computer readable storage medium according to claim 1, wherein:
   the group membership credential comprises a random value "x" that was generated for the first host system by the authentication server; and
   the first group private key is based at least in part on (a) the random value "x" that was generated for the first host system by the authentication server and (b) the random value "f1" that was generated by the first host system.

3. At least one non-transitory computer readable storage medium according to claim 1, wherein:
   the group membership credential comprises a group identifier (GID) for the subnet; and the GID is based at least in part on an Internet Protocol (IP) address for the subnet.

4. At least one non-transitory computer readable storage medium according to claim 3, wherein the group public key is based at least in part on the GID.

5. At least one non-transitory computer readable storage medium according to claim 3, wherein the group membership credential comprises:
   the GID for the subnet; and
   a random value "x" that was generated for the first host system by the authentication server.

6. At least one non-transitory computer readable storage medium according to claim 5, wherein
   the first group private key is based at least in part on: the random value "x" that was generated for the first host system by the authentication server; and
   the random value "f1" that was generated by the first host system.

7. At least one non-transitory computer readable storage medium according to claim 1, wherein:
   the group membership credential comprises a group identifier (GID) for the subnet;
   the GID is based at least in part on an Internet Protocol (IP) address for the subnet;
   the group public key comprises a key that was generated by a public key infrastructure (PKI) server based at least in part on the GID; and
   to receive the group public key comprises to receive the group public key from the PKI server via the authentication server.

8. At least one non-transitory computer readable storage medium according to claim 1, wherein the instructions when executed further enable the first host system to:
   in response to receiving a multicast message that was multicast to the subnet by a third host system, wherein the message comprises a signature that was generated by the third host system using a third group private key that was generated by the third host system, use the group public key and the signature in the multicast message to validate that the multicast message was generated by an authenticated member of the subnet.

9. A data processing system comprising:
   a hardware processor having at least one core to execute instructions; and at least one non-transitory computer readable storage medium coupled to the hardware processor, the at least one computer readable storage medium comprising instructions that when executed enable the data processing system to operate as a first host system by:
using a manufacturer-supplied key of the first host system to authenticate the first host system to an authentication server of a subnet;
sending a subnet join request to the authentication server of the subnet;
receiving a group public key for the subnet;
after authenticating the first host system to the authentication server and sending the subnet join request to the authentication server, receiving a group membership credential for the subnet from the authentication server;
generating a random value "f1" and generating a first group private key for the first host system, based at least in part on (a) the group membership credential for the subnet from the authentication server and (b) the random value "f1", wherein the first group private key corresponds to the group public key, in that data encrypted with the first group private key can be decrypted with the group public key; and
in response to receiving an address resolution protocol (ARP) request from a second host system on the subnet, wherein the ARP request comprises a signature that was generated by the second host system using a second group private key that was generated by the second host system based at least in part on a random value "f2" that was generated by the second host system, using the group public key and the signature in the ARP request to validate that the ARP request was generated by an authenticated member of the subnet.

10. A data processing system according to claim 9, wherein:
the group membership credential comprises a random value "x" that was generated for the first host system by the authentication server; and
the first group private key is based at least in part on (a) the random value "x" that was generated for the first host system by the authentication server and (b) the random value "f1" that was generated by the first host system.

11. A data processing system according to claim 9, wherein:
the group membership credential comprises a group identifier (GID) for the subnet; and
the GID is based at least in part on an Internet Protocol (IP) address for the subnet.

12. A data processing system according to claim 11, wherein the group public key is based at least in part on the GID.

13. A data processing system according to claim 11, wherein the group membership credential comprises:
the GID for the subnet; and
a random value "x" that was generated for the first host system by the authentication server.

14. A data processing system according to claim 13, wherein the first group private key is based at least in part on:
the random value "x" that was generated for the first host system by the authentication server; and
the random value "f1" that was generated by the first host system.

15. A data processing system according to claim 9, wherein:
the group membership credential comprises a group identifier (GID) for the subnet;
the GID is based at least in part on an Internet Protocol (IP) address for the subnet;
the group public key comprises a key that was generated by a public key infrastructure (PKI) server based at least in part on the GID; and
receiving the group public key comprises receiving the group public key from the PKI server via the authentication server.

16. A method comprising:
using a manufacturer-supplied key of a first host system to authenticate the first host system to an authentication server of a subnet;
sending a subnet join request from the first host system to the authentication server of the subnet;
at the first host system, receiving a group public key for the subnet;
at the first host system, after authenticating the first host system to the authentication server and sending the subnet join request to the authentication server, receiving a group membership credential for the subnet from the authentication server;
at the first host system, generating a random value "f1" and generating a first group private key for the first host system, based at least in part on (a) the group membership credential for the subnet from the authentication server and (b) the random value "f1", wherein the first group private key corresponds to the group public key, in that data encrypted with the first group private key can be decrypted with the group public key; and
at the first host system, in response to receiving an address resolution protocol (ARP) request from a second host system on the subnet, wherein the ARP request comprises a signature that was generated by the second host system using a second group private key that was generated by the second host system based at least in part on a random value "f2" that was generated by the second host system, using the group public key and the signature in the ARP request to validate that the ARP request was generated by an authenticated member of the subnet.

17. A method according to claim 16, wherein:
the group membership credential comprises a random value "x" that was generated for the first host system by the authentication server; and
the first group private key is based at least in part on (a) the random value "x" that was generated for the first host system by the authentication server and (b) the random value "f1" that was generated by the first host system.

18. A method according to claim 16, wherein:
the group membership credential comprises a group identifier (GID) for the subnet; and
the GID is based at least in part on an Internet Protocol (IP) address for the subnet.

19. A method according to claim 18, wherein the group public key is based at least in part on the GID.

20. A method according to claim 18, wherein the group membership credential comprises:
the GID for the subnet; and
a random value "x" that was generated for the first host system by the authentication server.

21. A method according to claim 20, wherein the first group private key is based at least in part on:

the random value "x" that was generated for the first host system by the authentication server; and the random value "f1" that was generated by the first host system.

\* \* \* \* \*